US011298792B2

(12) United States Patent
Zhang et al.

(10) Patent No.: US 11,298,792 B2
(45) Date of Patent: Apr. 12, 2022

(54) COMBINED ADDITIVE MANUFACTURING METHOD APPLICABLE TO PARTS AND MOLDS

(71) Applicant: HUAZHONG UNIVERSITY OF SCIENCE AND TECHNOLOGY, Hubei (CN)

(72) Inventors: Haiou Zhang, Hubei (CN); Guilan Wang, Hubei (CN); Huayu Zhang, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 102 days.

(21) Appl. No.: 16/462,222

(22) PCT Filed: Nov. 24, 2017

(86) PCT No.: PCT/CN2017/112908
§ 371 (c)(1),
(2) Date: Jun. 24, 2019

(87) PCT Pub. No.: WO2018/091000
PCT Pub. Date: May 24, 2018

(65) Prior Publication Data
US 2019/0329374 A1 Oct. 31, 2019

(30) Foreign Application Priority Data

Nov. 18, 2016 (CN) .......................... 201611034046.0

(51) Int. Cl.
B33Y 10/00 (2015.01)
B29C 44/36 (2006.01)
(Continued)

(52) U.S. Cl.
CPC ............ B24B 19/22 (2013.01); B29C 44/367 (2013.01); B33Y 10/00 (2014.12); B22F 10/40 (2021.01); B22F 2003/242 (2013.01); B28B 1/32 (2013.01)

(58) Field of Classification Search
CPC .......................... B33Y 10/00; B22F 2200/342
See application file for complete search history.

(56) References Cited

U.S. PATENT DOCUMENTS 8,905,742 B2 * 12/2014 Knighton .............. B29C 64/118
425/162
2006/0269685 A1 * 11/2006 Raybould ............... C23C 24/04
427/446
(Continued)

FOREIGN PATENT DOCUMENTS

CN 103521769 B 10/2015
CN 104985813 B 3/2017
(Continued)

OTHER PUBLICATIONS

CN105945281, Machine Translation, May 9, 2016. (Year: 2016).*
(Continued)

Primary Examiner — Robert A Vetere
(74) Attorney, Agent, or Firm — Troutman Pepper Hamilton Sanders LLP; Christopher C. Close, Jr.

(57) ABSTRACT

A combined additive manufacturing method applicable to parts and molds relates to moldless-growth manufacturing of parts and molds, which includes steps of: S1: layering and slicing a three-dimensional CAD (computer-aided design) model of a workpiece to be formed according to shape, thickness and dimensional accuracy requirements of the workpiece, so as to obtain a plurality of layered slice data; S2: planning a forming path according to the layered slice data, and generating layered slice numerical control codes for forming; and S3: deposition-forming a powder material
(Continued)

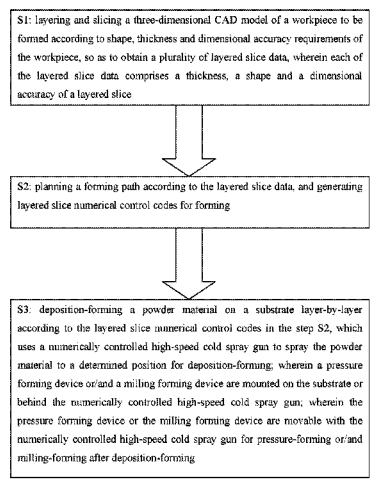

on a substrate layer-by-layer and performing pressure forming or milling forming according to the layered slice numerical control codes in the step S2, which uses a numerically controlled high-speed cold spray gun to spray the powder material to a determined position for deposition-forming. The method of the present invention overcomes thermally induced adverse effects of hot processing and drawbacks of cold spray deposition.

7 Claims, 1 Drawing Sheet

(51) Int. Cl.
  *B24B 19/22* (2006.01)
  *B22F 3/24* (2006.01)
  *B28B 1/32* (2006.01)
  *B22F 10/40* (2021.01)

(56) References Cited

U.S. PATENT DOCUMENTS

| | | | | |
|---|---|---|---|---|
| 2014/0271964 | A1* | 9/2014 | Roberts, IV | B29C 64/393 425/150 |
| 2015/0130117 | A1* | 5/2015 | Lacaze | B33Y 10/00 264/482 |
| 2015/0321217 | A1* | 11/2015 | Nardi | C23C 24/04 427/180 |
| 2015/0352618 | A1* | 12/2015 | Schmidt | B21D 5/00 428/174 |
| 2016/0311165 | A1* | 10/2016 | Mark | B33Y 70/00 |

FOREIGN PATENT DOCUMENTS

| | | | |
|---|---|---|---|
| CN | 105945281 B | * | 4/2019 |
| CN | 105945281 B | | 4/2019 |

OTHER PUBLICATIONS

Haiou Zhang, Xiangping Wang, Guilan Wang, Yang Zhang, (2013) "Hybrid direct manufacturing method of metallic parts using deposition and micro continuous rolling", Rapid Prototyping Journal, vol. 19 Issue: 6, pp. 387-394.

Zhang Hai-ou, Rui Wang, Liye Liang, Wang Gui-Ian, (2016) "HDMR technology for the aircraft metal part", Rapid Prototyping Journal, vol. 22 Issue: 6, pp. 857-863.

Xiong Xinhong et al., Research on surface finishing of metal part manufactured by HPDM, J. Huazhong Univ. of Sci. & Tech. (Nature Science Edition), vol. 35 No. 10, Oct. 2007, pp. 87-90.

Haiou Zhang, Jipeng Xu, Guilan Wang, Fundamental study on plasma deposition manufacturing, Surface and Coatings Technology 171 (2003) 112-118.

Youheng Fu et al., Investigation of mechanical properties for hybrid deposition and microrolling of bainite steel, Journal of Materials Processing Tech. 250 (2017) 220-227.

Hu Sheng-de et al., Numerical simulation of powders state in plasma jet by lattice Boltzmann method, Journal of Central China Normal University Na t. Sci.), vol. 39 No. 3 Sep. 2005 pp. 336-339.

Zhang Hai'ou et al., Microstructure of directly formed super alloy by plasma fused-deposition, J. Huazhong Univ. of Sci. & Tech. (Nature Science Edition), vol. 33 No. 11, Nov. 2005, pp. 54-56.

Zhang Hai'ou et al., Directly Manufacturing of Superalloy Double Helix Integrated Impeller by Hybrid Plasma Deposition & Milling, China Mechanical Engineering vol. 18, Issue 14, the second half of Jul. 2007, pp. 1723-1726.

Wang Wei et al., Design of control system for robot plasma spraying, J. Huazhong Univ. of Sci. & Tech. (Nature Science Edition), vol. 33 No. 7, Jul. 2005, pp. 74-76.

* cited by examiner

S1: layering and slicing a three-dimensional CAD model of a workpiece to be formed according to shape, thickness and dimensional accuracy requirements of the workpiece, so as to obtain a plurality of layered slice data, wherein each of the layered slice data comprises a thickness, a shape and a dimensional accuracy of a layered slice

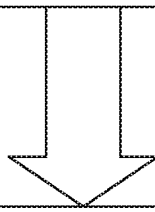

S2: planning a forming path according to the layered slice data, and generating layered slice numerical control codes for forming

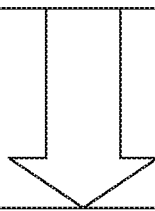

S3: deposition-forming a powder material on a substrate layer-by-layer according to the layered slice numerical control codes in the step S2, which uses a numerically controlled high-speed cold spray gun to spray the powder material to a determined position for deposition-forming; wherein a pressure forming device or/and a milling forming device are mounted on the substrate or behind the numerically controlled high-speed cold spray gun; wherein the pressure forming device or the milling forming device are movable with the numerically controlled high-speed cold spray gun for pressure-forming or/and milling-forming after deposition-forming

COMBINED ADDITIVE MANUFACTURING METHOD APPLICABLE TO PARTS AND MOLDS

CROSS REFERENCE OF RELATED APPLICATION

This is a U.S. National Stage under 35 U.S.C 371 of the International Application PCT/CN2017/112908, filed Nov. 24, 2017, which claims priority under 35 U.S.C. 119(a-d) to CN 201611034046.0, filed Nov. 18, 2016.

BACKGROUND OF THE PRESENT INVENTION

Field of Invention

The present invention relates to moldless-growth manufacturing of parts and molds, and more particularly to a combined additive manufacturing method applicable to parts and molds.

Description of Related Arts

The moldless deposition forming method of high-density metal parts or molds mainly includes high-power laser deposition forming, electron beam free forming, plasma arc and arc deposition forming.

Among them, the high-power laser deposition forming adopts a high-power laser to melt the metal powder sent to the substrate layer by layer, and rapidly solidify for deposition forming, thereby finally obtaining a near-finished part. The method has high forming precision and density of the workpiece is much higher than that of selective laser sintered parts, but the forming efficiency, and energy and material utilization are not high. It is difficult to reach full density while equipment investment and operating costs are high (see: A. J. Pinkkerton, L. Li, Effects of Geometry and Composition in Coaxial Laser Deposition of 316L Steel for Rapid Protyping, Annals of the CIRP, Vol. 52, 1(2003), p 181-184).

The electron beam free forming method uses a high-power electron beam to melt the powder material, applies an electromagnetic field according to a computer model, controls the movement of the electron beam, and scans layer by layer until the entire part is formed. The method has high forming precision and good forming quality, but the process conditions are strict, wherein the entire forming process needs to be carried out in a vacuum, resulting in limited forming dimensions, high equipment investment and high operating costs. Furthermore, it is difficult to be used for forming gradient functional material parts due to the same layering method as selective sintering (see: Matz J. E., Eagar T. W. Carbide formation in Alloy 718 during electron-beam solid freeform fabrication. Metallurgical and Materials Transactions A: Physical Metallurgy and Materials Science, 2002, v33(8): p 2559-2567).

The plasma deposition forming method melts metal powder or wire, which is synchronously supplied, by a highly compressed and clustered plasma beam, so as to layer-by-layer deposit on a substrate to form a metal part or a mold. Forming efficiency and utilization rate of the method are better than the former two methods. It is easy to obtain full density with low equipment and running cost. However, because the diameter of the arc column is larger than that of the former two, the size and surface precision of the forming are not as good as the former two. Therefore, like the high-power laser deposition forming method, finishing is needed after forming (see: Haiou Zhang, Jipeng Xu, Guilan Wang, Fundamental Study on Plasma Deposition Manufacturing, Surface and Coating Technology, v. 171 (1-3), 2003, pp. 112-118; Zhang Haiou, Wu Hongjun, Wang Guilan, Chen Jing, Research on the microstructure of direct forming high temperature alloy parts by plasma deposition, Journal of Huazhong University of Science and Technology (Natural Science Edition), v 33, n 11, 2005, p 54-56).

However, the directly formed difficult-to-machine material parts increase the surface hardness due to rapid solidification, which makes processing very difficult. Parts with complicated shapes need to be clamped many times, resulting in long processing time, sometimes even accounting for more than 60% of the entire manufacturing cycle. It has become a bottleneck for low-cost short-flow growth manufacturing of high-performance and difficult-to-machine parts. For this reason, a combined moldless rapid manufacturing method of plasma deposition forming and milling has emerged, in which a plasma beam is used as a forming heat source. In the layered or staged deposition forming process, the deposition forming and the numerical control milling finishing are sequentially performed, so as to achieve short-flow, low-cost direct and accurate manufacturing (see: Chinese patent ZL00131288.X, Direct and rapid manufacturing of molds and parts and its equipment; Zhang Haiou, Xiong Xinhong, Wang Guilan, Plasma deposition/milling combined direct manufacturing of superalloy double helix integral impeller, China Mechanical Engineering, 2007, Vol 18, No. 14: P 1723-1725).

Among the above three methods, the high-power laser deposition forming method and the plasma arc forming method are methods without support, moldless deposition forming forming homogeneous or composite gradient functional material parts. Compared with supported moldless deposition forming methods such as electron beam forming, selective laser sintering/melting, and LOM (Laminated Object Manufacturing), SLA (Stereolithography Apparatus), FDM (Fused Deposition Modeling) and SLS (Selective Laser Sintering) using paper, resin, plastic, etc., there is no need to add or remove supporting maters during forming. As a result, many disadvantages of materials, processes, and equipment for doing so are avoid, which reduces manufacturing time and cost, and can form parts of gradient functional materials. At the same time, due to being unsupported, during the forming process of complex shaped parts with cantilever, the molten material may fall or flow under the action of gravity, making it difficult to form. The plasma deposition milling combined manufacturing method reduces the processing complexity by layer forming and milling finishing. However, for the complicated shape parts with large inclination angles on the side, especially the lateral overhangs, the flow and even drop caused by gravity during depositing are still unavoidable, making it difficult to grow horizontally.

Therefore, some international research institutions such as the University of Michigan, Southern Methodist University, and the National University of Singapore studied the use of variable-direction slicing techniques for selecting the direction with the most support conditions as the main direction of part forming, or decomposed complex-shaped parts into several simple-shaped parts for forming in sequence; or developed five-axis moldless forming equipment and software to make the melt-forming material as supportive as possible (see: P. Singh, D. Dutta, Multi-direction slicing for layered manufacturing, Journal of Computing and Information Science and Engineering, 2001, 2, pp: 129-142; Jianzhong Ruan, Todd E. Sparks, Ajay Panackal et. al. Automated Slicing for a Multiaxis Metal Deposition System. Journal of Manufacturing Science and Engineering. APRIL 2007, Vol. 129. pp: 303-310; R. Dwivedi, R. Kovacevic, An expert system for generation of machine inputs for laser-based multi-directional metal deposition, International Journal of Machine Tools & Manufacture, 46 (2006), pp: 1811-1822).

The five-axis machining technology can significantly improve the support conditions for growth forming and avoid the falling of materials. However, for complex and fine-walled parts, gas-protected plasma arc/arc, vacuum-protected electron beam, slag protection heat source deposition forming such as electroslag welding and submerged arc welding, although efficiency is improved and cost is reduced, it is difficult to form thin walls and fine shapes due to these heat sources. The forming precision and the thin wall are less than the high-power laser deposition forming method (see: Almeida P M S, Williams S, Innovative process model of Ti-6Al-4V additive layer manufacturing using cold metal transfer (CMT) [C]. Proceedings of the 21th Annual International Solid Freeform Fabrication Symposium, Austin, Tex., USA, 2010: 25-26), so it is difficult to obtain parts that are finer and thinner than laser forming.

In addition, aerospace, energy and other industries have high requirements on the structural properties and stability of components. Due to rapid heating, rapid solidification and free growth forming of conventional moldless additive manufacturing method, cracking, stomata and other defects are difficult to avoid, and structure performance and stability are not satisfactory. The above problems have become the key technical difficulties and bottlenecks of whether the deposition direct additive forming technology can further develop and industrial application can be realized, and are urgently needed to solve. Therefore, there is a need to develop a new method which can effectively improve manufacturing precision, improve formability, and improve structural properties of parts.

In summary, the use of the above-mentioned technology for additive manufacturing is essentially a "hot forming process" in which molten metal is cast by heat source input. Defects in the casting and welding processes such as pores, shrinkage cavities, unfused and slag inclusions, and the adverse effects of heat such as dilution, oxidation, decomposition, phase transformation, deformation, cracking, runny and collapse are difficult to avoid completely.

SUMMARY OF THE PRESENT INVENTION

In view of the above defects or improvement requirements of the prior art, the present invention provides a combined additive forming processing method suitable for parts and molds, which combines high-speed cold spraying and milling or press forming processes skillfully, so as to overcome defects of conventional moldless growth manufacturing methods of parts and molds caused by hot forming process, and overcome the deposition defects caused by simply using high-speed cold spraying.

Accordingly, in order to accomplish the above objects, the present invention provides a combined additive manufacturing method applicable to parts and molds, comprising steps of:

S1: layering and slicing a three-dimensional CAD (computer-aided design) model of a workpiece to be formed according to shape, thickness and dimensional accuracy requirements of the workpiece, so as to obtain a plurality of layered slice data, wherein each of the layered slice data comprises a thickness, a shape and a dimensional accuracy of a layered slice;

S2: planning a forming path according to the layered slice data, and generating layered slice numerical control codes for forming; and S3: deposition-forming a powder material on a substrate layer-by-layer according to the layered slice numerical control codes in the step S2, which uses a numerically controlled high-speed cold spray gun to spray the powder material to a determined position for deposition-forming;

wherein the numerically controlled high-speed cold spray gun moves above a coating surface of the substrate during operation, and a pressure forming device or/and a milling forming device are mounted behind the numerically controlled high-speed cold spray gun; wherein the pressure forming device or/and the milling forming device are adjacent to or multiple layers away from an area to be processed (the multiple layers are one, two, three, or other number of layers according to actual engineering needs); wherein during high-speed cold spray forming, the pressure forming device or/and the milling forming device are movable with the numerically controlled high-speed cold spray gun for pressure-forming or/and milling-forming after deposition-forming, so as to improve forming property and forming precision of deposition-forming.

In the above inventive concept, the pressure forming device or/and the milling forming device are closely adjacent to or multiple layers away from the area to be processed. When the pressure forming device or/and the milling forming device are closely adjacent to the area to be processed, a current formed layer can be subjected to pressure or milling right after the layer-by-layer deposition-forming. When the pressure forming device or/and the milling forming device are multiple layers away from the area to be processed, a previously formed layer before the current formed layer can be processed, namely processing one layer, two layers, three layers or other layers before.

In the above inventive concept, the milling forming device or the pressure forming device combined with high-speed cold spray additive forming can be fixed on the high-speed cold spray gun, a numerical control processing head or a robot wrist, which moves above a forming surface of the substrate with the high-speed cold spray gun or a certain distance away from the numerical-controlled high-speed cold spray gun, for material milling forming or pressure forming.

In the above inventive concept, the high-speed cold spray additive forming and the milling or pressure forming are combined or separated layer-by-layer or layers-by-layers, until to the dimension, surface precision and quality requirements of the parts or molds are satisfied.

In the above inventive concept, during unsupported and moldless forming of high-speed cold spray, the material in the coating region is forced to be deformed with pressure through the milling forming device or the pressure forming device installed behind the sprayed layer. Compressive strain and compressive stress state caused by forced deform can avoid cracking, reduce or eliminate residual stress, and improve the performance of the structure. In addition, it can effectively reduce the taper and side surface step effect of the upper surface of the formed body, and improve the forming precision and surface quality. Thus, only a small amount or no milling is required, and only the grinding or polishing process is needed to achieve the dimension and surface accuracy of the parts.

Preferably, in the step S3, when the powder material is sprayed to the determined position by the numerically controlled high-speed cold spray gun for deposition-forming, the substrate and spray particles are simultaneously heated to be simultaneously soften, thereby reducing a critical speed required for particle deposition.

Preferably, in the step S3, when the powder material is sprayed to the determined position by the numerically controlled high-speed cold spray gun for deposition-forming, the substrate and spray particles are simultaneously heated to be simultaneously soften; wherein the sprayed particles are selected from the group consisting of metals, intermetallic compounds, ceramics, cermets, ceramic composites, and gradient functional materials whose structures and compositions are gradient-changeable, and nitrogen is used as a protection gas during deposition-forming.

Preferably, the combined additive manufacturing method further comprises a step S4: finishing the workpiece to be formed with milling, grinding or polishing layer-by-layer or layers-by-layers when the workpiece is unable to meet dimension and surface precision requirements of the parts or the molds during layer-by-layer deposition-forming, until the dimension and surface precision requirements of the parts or the molds are satisfied. In S4, in order to improve the forming efficiency and forming precision, a plurality of high-speed cold spray guns and combined milling or pressure forming devices may be installed to perform combined additive forming.

In general, the above technical solutions conceived by the present invention can achieve the following beneficial effects compared with the prior art:

The present invention maintains the high-speed cold spraying as a "cold processing" of low heat input, which can effectively avoid the thermal-induced adverse effects occurring during the "hot forming process" of thermal spraying and deposition of laser, electron beam, arc and the like. The present invention can obtain parts or molds of metals, intermetallic compounds, cermets, ceramics and composite gradient functional materials with high quality, fastness and low cost.

The method of the present invention solves the practical engineering problem, and the parts or molds prepared by the method of the present invention have no thermal defects such as pores, shrinkage, unfusion, slag inclusion, dilution, oxidation, decomposition, phase transformation, deformation, cracking, flow, collapse, etc. In addition, there is no problem of low mechanical properties, and it is also applicable to hard materials. The range of sprayable materials is wide. The method of the present invention also overcomes the fact that the coating surface is tapered after cold spraying, resulting in a linear decrease in deposition rate, and high equipment as well as operating costs.

The present invention can also be used for surface repair or strengthening of parts or molds, overcoming the technical bottleneck of the conventional method that after repairing or strengthening, it is very difficult to provide subsequent finishing to repaired and strengthened layers after quench hardening.

BRIEF DESCRIPTION OF THE DRAWINGS

FIGURE is a flow chart of a combined additive manufacturing method applicable to parts and molds according to embodiments of the present invention.

DETAILED DESCRIPTION OF THE PREFERRED EMBODIMENT

The present invention will be further described in detail below with reference to the accompanying drawings and embodiments. It is understood that the specific embodiments described herein are merely illustrative and are not intended to be limiting. Furthermore, the technical features involved in the various embodiments of the present invention described below may be combined with each other as long as they do not constitute a conflict with each other.

The method of the instant invention skillfully combines the high-speed cold spraying technology and the milling forming or pressure forming process, and can fully utilize the advantages of high-speed cold spraying, so that the prepared product has neither defects of hot forming nor defects of high-speed cold spraying process.

In order to further explain the advantages of the method of the present invention, the following is a detailed description of the high speed cold spray technique:

High-speed cold spray technology is a new type of coating preparation method and is being applied to additive manufacturing. The technology uses a high-pressure gas carrying particles to generate a supersonic gas-solid two-phase flow through a Laval nozzle. The particles impact on the substrate in a completely solid state, undergoing severe plastic deformation and depositing to form a coating, which is a low-heat input "cold forming process". The process can effectively avoid the adverse effects of heat generated in the above "hot forming process".

However, because the cold spray technology only relies on high-speed flying particles to impact the substrate and combine with severe plastic deformation, the critical speed required for particle deposition is higher, and it is more suitable for spraying plastic materials. In recent years, with the continuous research on the deposition mechanism, the application range of cold spray is expanding, but the range of sprayable materials is still smaller than that of thermal spraying and laser cladding. For hard materials, cold spraying is difficult to achieve effective deposition, and there is insufficient density, plasticity and toughness. The surface of the coating is tapered after continuous spraying, resulting in poor dimensional and surface precision, and the deposition rate decreases linearly. For the preparation of high-strength material coatings, cold spraying technology requires the use of helium to spray particles to achieve the high collision speed required for effective bonding, which the cost of using helium is more than 80 times the cost of using nitrogen. Even for some materials that has good plasticity and can be sprayed with nitrogen, it is also necessary to rely on a high-power gas heater to heat the gas to increase the particle speed. However, this will increase both equipment and operating costs. Therefore, the simply used cold spray technology is not very competitive in terms of economy and application compared to other surface coating technologies.

The present invention introduces pressure processing or milling processing technology in the high-speed cold spraying process, which overcomes the defects of high-speed cold spraying, and ensures the final precision and performance of the product.

The application of the method of the present invention in the preparation of parts and molds will be further described in detail below in conjunction with specific embodiments.

Embodiment 1

According to performance requirements of iron-nickel-chromium alloy parts, high-speed cold spray forming is carried out using iron-nickel-chromium alloy powder.

On a substrate, according to a digital additive forming path obtained by a three-dimensional CAD model of a part, a high-speed cold spray gun is used to move above the substrate to be formed to perform metal deposition forming;

wherein during the forming process, a micro roll fixed behind the high-speed cold spray gun moves therewith, so high-speed cold spray forming and continuous cold forging rolling pressure forming are simultaneously performed; if dimension and surface precision cannot satisfy requirements, surface finishing is needed during the above synchronous forming process layer-by-layer or layers-by-layers. Therefore, according to grinding and polishing path planning combined with the synchronous forming process path, grinding and polishing are performed layer-by-layer or layers-by-layers during the synchronous forming process.

The finishing process is alternated with the simultaneous forming process until a mold cavity forming process is completed, and the dimension and surface precision requirements are satisfied. For forming of a high hardness alloy powder material, a high frequency induction heating device can be used to simultaneously heat a powder forming region and soften the substrate, so as to improve formability and coating properties.

Embodiment 2

According to performance requirements of high-temperature alloy parts, high-speed cold spray forming is carried out using high-temperature alloy powder.

On a substrate, according to a digital additive forming path obtained by a three-dimensional CAD model of a part, a high-speed cold spray gun is used to move above the substrate to be formed to perform metal deposition forming;

wherein during the forming process, a spin forming device fixed behind the high-speed cold spray gun moves therewith, so high-speed cold spray forming and rotary pressure forming are simultaneously performed; if dimension and surface precision cannot satisfy requirements, surface finishing is needed during the above synchronous forming process layer-by-layer or layers-by-layers. Therefore, according to grinding and polishing path planning combined with the synchronous forming process path, grinding and polishing are performed layer-by-layer or layers-by-layers during the synchronous forming process.

The finishing process is alternated with the simultaneous forming process until a mold cavity forming process is completed, and the dimension and surface precision requirements are satisfied.

Embodiment 3

According to performance requirements of aluminium alloy parts, high-speed cold spray forming is carried out using aluminium alloy powder.

On a substrate, according to a digital additive forming path obtained by a three-dimensional CAD model of a part, a high-speed cold spray gun is used to move above the substrate to be formed to perform metal deposition forming;

wherein during the forming process, a milling cutter, laser or electric spark milling machine fixed behind the high-speed cold spray gun moves therewith, so high-speed cold spray forming and milling forming are simultaneously performed; if dimension and surface precision cannot satisfy requirements, surface finishing is needed during the above synchronous forming process layer-by-layer or layers-by-layers. Therefore, according to grinding and polishing path planning combined with the synchronous forming process path, grinding and polishing are performed layer-by-layer or layers-by-layers during the synchronous forming process.

The finishing process is alternated with the simultaneous forming process until a mold cavity forming process is completed, and the dimension and surface precision requirements are satisfied.

Embodiment 4

According to performance requirements of ceramic parts, high-speed cold spray forming is carried out using ceramic powder.

On a substrate, according to a digital additive forming path obtained by a three-dimensional CAD model of a part, a high-speed cold spray gun is used to move above the substrate to be formed to perform metal deposition forming;

wherein during the forming process, a pressure forming device fixed behind the high-speed cold spray gun moves therewith, so high-speed cold spray forming and equal material forming are simultaneously performed; if dimension and surface precision cannot satisfy requirements, surface finishing is needed during the above synchronous forming process layer-by-layer or layers-by-layers. Therefore, according to grinding and polishing path planning combined with the synchronous forming process path, grinding and polishing are performed layer-by-layer or layers-by-layers during the synchronous forming process.

The finishing process is alternated with the simultaneous forming process until a mold cavity forming process is completed, and the dimension and surface precision requirements are satisfied. For forming of a high hardness and brittle ceramic powder material, a laser beam can be used to simultaneously heat a powder forming region and soften the substrate, so as to improve formability and coating properties.

Embodiment 5

According to performance requirements of metal and ceramic gradient combined parts, gradient combined material high-speed cold spray forming is carried out using a gradient functional material powder feeder and an accelerator.

On a substrate, according to a digital additive forming path obtained by a three-dimensional CAD model of a part, a high-speed cold spray gun is used to move above the substrate to be formed to perform metal deposition forming;

wherein during the forming process, a pressure forming device fixed behind the high-speed cold spray gun moves therewith, so high-speed cold spray forming and equal material forming are simultaneously performed; if dimension and surface precision cannot satisfy requirements, surface processing is needed during the above synchronous forming process layer-by-layer or layers-by-layers. Therefore, according to surface laser milling, grinding and polishing path planning combined with the synchronous forming process path, surface finishing are performed layer-by-layer or layers-by-layers during the synchronous forming process.

The finishing process is alternated with the simultaneous forming process until a mold cavity forming process is completed, and the dimension and surface precision requirements are satisfied. For forming of a high hardness and brittle ceramic powder material, a laser beam can be used to simultaneously heat a powder forming region and soften the substrate, so as to improve formability and coating properties.

The present invention provides a combined additive forming processing method for parts and molds, which can effectively solve some defects of conventional moldless growth manufacturing method of parts and molds such as pores, shrinkage, unmelting, slag inclusion caused by metal melting deposition "hot forming process", and thermal adverse effects such as dilution, oxidation, decomposition, phase transformation, deformation, cracking, falling, runny and collapse. And for example, the coating layer formed by simply-used high-speed cold spray deposition has low mechanical properties in density, plasticity, and toughness; hard materials are difficult to achieve effective deposition and a coating material range is small; a coating surface is tapered after continuous cold spraying which leads to a linear decrease in deposition rate; surface and dimensional accuracy is low, and equipment and operating costs are high.

Those skilled in the art will understand that the above description is only preferred embodiments of the present invention, and is not intended to be limiting. Any modifications, equivalent substitutions and improvements made within the spirit and scope of the present invention are within the scope of the present invention.

What is claimed is:

1. A combined additive manufacturing method applicable to parts and molds, comprising the steps of:
   S1: layering and slicing a three-dimensional CAD (computer-aided design) model of a workpiece to be formed according to shape, thickness and dimensional accuracy requirements of the workpiece, so as to obtain a plurality of layered slice data, wherein each of the layered slice data comprises a thickness, a shape and a dimensional accuracy of a layered slice;
   S2: planning a forming path according to the layered slice data, and generating layered slice numerical control codes for forming; and
   S3: deposition-forming a powder material on a substrate layer-by-layer according to the layered slice numerical control codes in the step S2, which uses a numerically controlled high-speed cold spray gun to spray the powder material to a determined position for deposition-forming;
   wherein the numerically controlled high-speed cold spray gun moves above a coating surface of the substrate during operation, and a pressure forming device and a milling forming device are mounted behind the numerically controlled high-speed cold spray gun;
   wherein the pressure forming device and the milling forming device are multiple layers away from an area to be processed;
   wherein during high-speed cold spray forming, the pressure forming device and the milling forming device are movable with the numerically controlled high-speed cold spray gun for pressure-forming and milling-forming after deposition-forming, so as to improve forming property and forming precision of deposition-forming;
   wherein sprayed particles are selected from the group consisting of metals, intermetallic compounds, ceramics, cermets, ceramic composites, and gradient functional materials.

2. The combined additive manufacturing method, as recited in claim 1, wherein in the step S3, when the powder material is sprayed to the determined position by the numerically controlled high-speed cold spray gun for deposition-forming, the substrate and spray particles are simultaneously heated to be simultaneously soften, thereby reducing a critical speed required for particle deposition.

3. The combined additive manufacturing method, as recited in claim 2, further comprising a step S4,
   S4: finishing the workpiece to be formed with milling, grinding or polishing layer-by-layer or layers-by-layers when the workpiece is unable to meet dimension and surface precision requirements of the parts or the molds during layer-by-layer deposition-forming, until the dimension and surface precision requirements of the parts or the molds are satisfied.

4. The combined additive manufacturing method, as recited in claim 1, wherein in the step S3, when the powder material is sprayed to the determined position by the numerically controlled high-speed cold spray gun for deposition-forming, the substrate and spray particles are simultaneously heated;
   wherein structures and compositions of the sprayed particles are gradient-changeable, and nitrogen is used as a protection gas during deposition-forming.

5. The combined additive manufacturing method, as recited in claim 3, further comprising a step S4,
   S4: finishing the workpiece to be formed with milling, grinding or polishing layer-by-layer or layers-by-layers when the workpiece is unable to meet dimension and surface precision requirements of the parts or the molds during layer-by-layer deposition-forming, until the dimension and surface precision requirements of the parts or the molds are satisfied.

6. The combined additive manufacturing method, as recited in claim 1, further comprising a step S4,
   S4: finishing the workpiece to be formed with milling, grinding or polishing layer-by-layer or layers-by-layers when the workpiece is unable to meet dimension and surface precision requirements of the parts or the molds during layer-by-layer deposition-forming, until the dimension and surface precision requirements of the parts or the molds are satisfied.

7. The combined additive manufacturing method, as recited in claim 1, wherein during the high-speed cold spray forming, the milling forming device is synchronically movable with the numerically controlled high-speed cold spray gun such that the high-speed cold spray forming and milling forming are simultaneously performed.

* * * * *